United States Patent [19]

Murray

[11] Patent Number: 5,450,715
[45] Date of Patent: Sep. 19, 1995

[54] WHEEL ASSEMBLY FOR GRASS TRIMMERS AND THE LIKE

[76] Inventor: David C. Murray, 4055 SE. Washington St., Milwaukie, Oreg. 97222

[21] Appl. No.: 222,224

[22] Filed: Apr. 4, 1994

[51] Int. Cl.⁶ .................... A01D 34/67; A01D 34/84; A01D 67/00; A01G 3/06
[52] U.S. Cl. ..................... 56/16.9; 56/12.7; 56/17.5
[58] Field of Search ...................... 56/17.5, 17.2, 17.1, 56/16.7, 16.9, 12.7, DIG. 9, 400.14; 172/17, 354, 669, 675; 30/276, 290

[56] References Cited

U.S. PATENT DOCUMENTS

| | | | |
|---|---|---|---|
| 4,224,784 | 9/1980 | Hansen | 56/12.7 X |
| 4,442,659 | 4/1984 | Enbusk | 56/12.7 |
| 4,531,350 | 7/1985 | Huthmacher | 56/17.5 |
| 4,688,376 | 8/1987 | Wolfe | 56/16.7 |
| 4,704,849 | 11/1987 | Gilbert | 56/17.5 |
| 4,829,755 | 5/1989 | Nance | 56/17.1 |
| 4,891,931 | 1/1990 | Holland | 56/16.7 |
| 4,894,916 | 1/1990 | Nimz | 30/298.4 |
| 4,914,899 | 4/1990 | Carmine | 56/16.7 |
| 4,922,694 | 5/1990 | Emoto | 56/12.7 X |
| 5,092,112 | 3/1992 | Buckendorf, Jr. | 56/17.5 |
| 5,107,665 | 4/1992 | Wright | 56/12.7 |
| 5,222,750 | 6/1993 | Ellis | 56/12.7 X |

*Primary Examiner*—Stephen J. Novosad

[57] ABSTRACT

A wheel assembly for attachment to hand-held devices such as trimmers, edgers, blowers, metal detectors and the like includes a wheeled frame having a clamp arranged to be freely secured to the wand of a device for rotation of the wand therein. Stop members engage the wand on each side of the clamp to prevent relative longitudinal sliding movement of the wand and the clamp. The wheel assembly is thus able to be mounted on and retained in a desired position on the wand while still permitting the wand to be rotated as desired to orient the working end of the device, as for example with a string trimmer device, between a mowing orientation and an edging orientation.

2 Claims, 2 Drawing Sheets

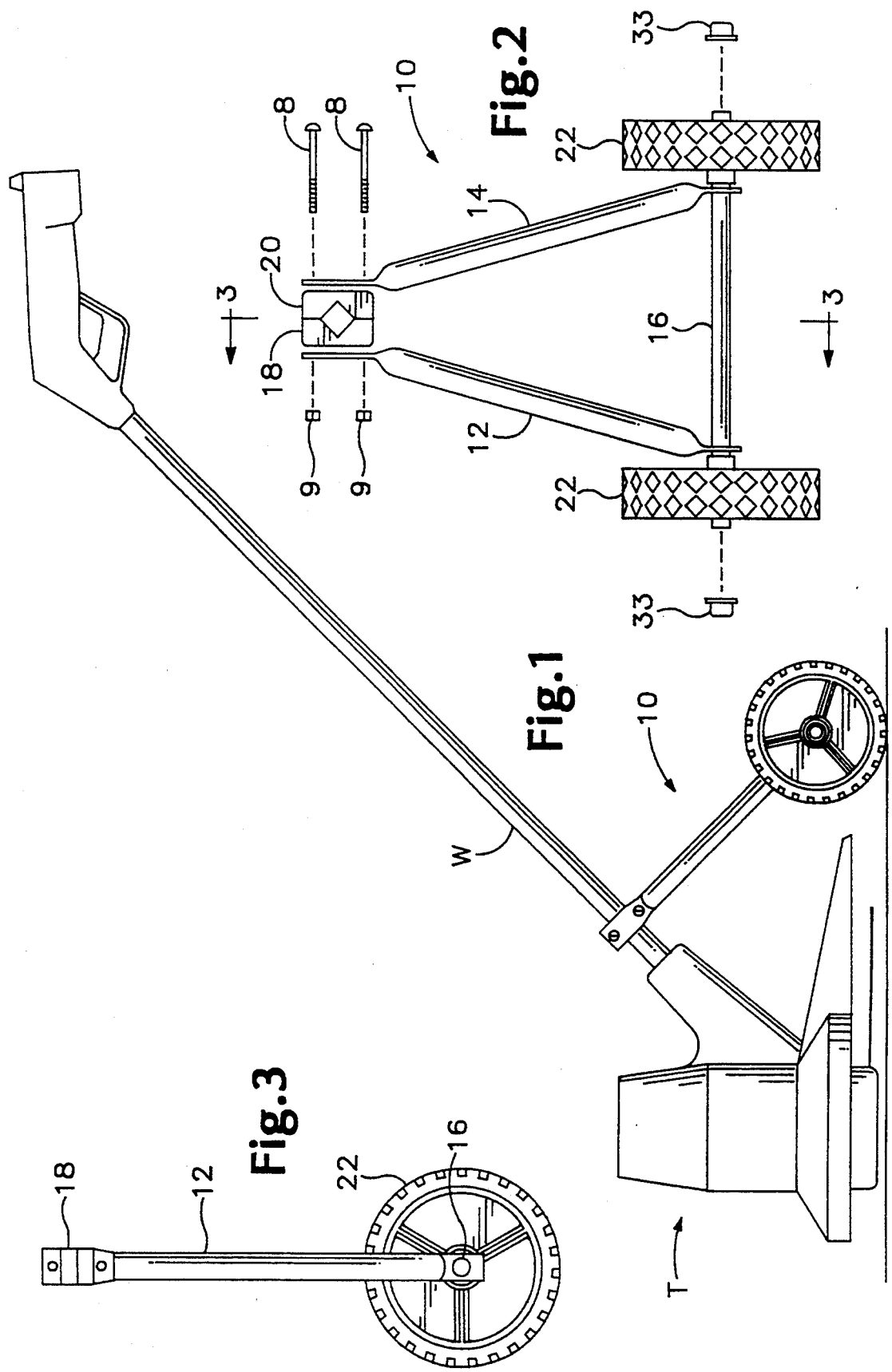

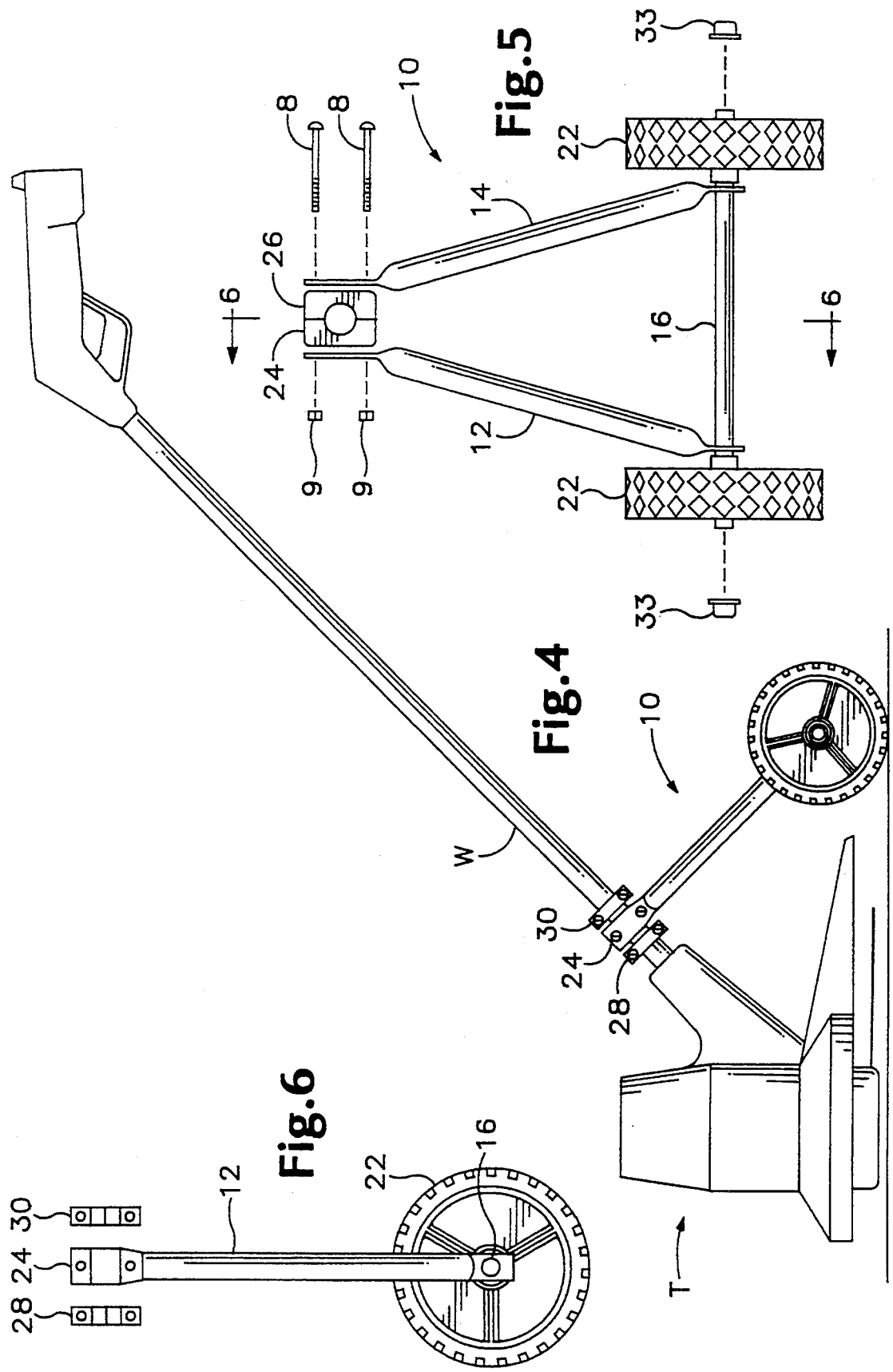

WHEEL ASSEMBLY FOR GRASS TRIMMERS AND THE LIKE

BACKGROUND OF INVENTION

This invention attaches to gas and electric lawn and garden string trimmers, metal detectors and similar such devices to make them easier to use. The invention provides and easily attachable wheel frame arranged to clamp to to the trimmer. It supports the trimmer on the ground and allows the operator to use it without having to carry it, and therefore relieves back, neck and shoulder strain. It also allows the operator to use it faster and more easily. It is well known that the operation of such tools as these places a strain on certain parts of the body: the neck, back, shoulders and hips are the most easily affected. It is also well known by those that use these tools regularly i.e. lawn and garden care specialists for example, that doing a good job can be difficult because of the awkwardness and poor balance of these tools. Devices that have attempted to relieve this problem, U.S. Pat. No. 4,891,931 U.S. Pat. No. 4,688,376 and U.S. Pat. No. 4,704,849 do not adequately provide a usable method of accomplishing this goal.

SUMMARY OF INVENTION

In it's basic concept, this invention provides a simple wheel assembly that is attached or removed easily from the appliance to be supported, without major modification or damage to it.

No combination of string trimmers and wheel supports is believed to provide the advantages of this invention.

A principal object of the invention is to provide wheel support for the working end of a trimmer or other tool, so that it can be operated without strain to the back, neck shoulders etc.

Another object is to allow a string trimmer to be used as a lawn mower, by keeping the cutting distance from the ground the same during operation.

Another object is to provide a lightweight, easily attached or removed wheel attachment, that does not require major altering of the item, or damage the item it is attached to.

Another object is to provide an attachment that is easy and inexpensive to manufacture, easy to assembly, is compact for shipping and storage and is durable and pleasing to the eye, and lets the operator do an effective job easier, faster and better.

BRIEF DESCRIPTION OF THE DRAWINGS

FIG. 1 is a side view of a trimmer of the type used to trim lawns and cut weeds, with a wheel attachment embodying the features of this invention mounted thereon.

FIG. 2 is a front view of the wheel attachment shown in FIG. 1.

FIG. 3 is a section view taken along the line 3—3 in FIG. 2.

FIG. 4 is a side view of the second preferred embodiment, with the stop bushing in front of and behind the wheel attachment.

FIG. 5 is a front view of the second preferred embodiment, with the dimensional bushing to allow the trimmer to twist in the bracket.

FIG. 6 is a section view taken along the line 6—6 in FIG. 5.

DESCRIPTION OF PREFERRED EMBODIMENT

An electric or gas powered trimmer (T) is shown in FIG. 1 of the drawings mounting a wheel attachment assembly (10) embodying the features of this invention for supporting the working end of the trimmer (T) A desired distance above the ground surface, without effort by the operator. As illustrated in FIG. 2, the wheel assembly in this embodiment comprises a substantially "A-shaped" frame (10) formed by opposite leg members (12,14) mounting an axle (16) at one of their ends and a clamp and bushing assembly (18,20) mounted to the opposite end of the legs. The clamp assembly is configured to frictionally engage the wand (W) of a trimmer and securely mount the wheel assembly (10) rigidly in place. FIG. 2 shows the clamp assembly as comprising two corresponding halves (18,20) that fasten together over the trimmer wand (W) with conventional fasteners (8,9). Leg members (12,14) extend downward and outward from the clamp assembly and mount an axle (16) to which a pair of wheels (22) are mounted as by fasteners (33). The trimmer (T) can thus be rolled over a ground surface in any direction desired, instead of carrying it. FIG. 3 is a sectional view taken along line 3—3 in FIG. 2.

An alternative embodiment of the invention is illustrated in FIGS. 4, 5, 6 of the drawings, wherein a bushing and clamp assembly (24,26,28,30) may be provided to permit the trimmer wand (W) to be rotated in the bracket in order to vary the cutting angle of the trimmer simply by twisting the wand (W) in one direction or another. This embodiment used the same "A-shaped frame" (10), axle (16) and wheels and fasteners (22,33) assembly as described previously in FIG. 2. However the bushing hole diameter formed between bushings (24,26) allows the wand to rotate freely therein. Stop clamps (28,30) are provided to frictionally engage the wand on each side of the bushings (24,26), to confine the bushing assembly to a desired position along the wand. Thus the trimmer wand is permitted to rotate on it's mount to the wheel assembly while being retained against longitudinal displacement along the wand by fixedly mounted clamps (28,30).

To attach the wheel attachment assembly to a hand held trimmer, edger or metal detector, a user simply places each half of the bracket and bushing assembly on opposite sides of the trimmer wand (W), clamping them together with the fasteners (8,9).

Once fitted with the wheel attachment assembly of this invention, the operation of a trimmer, edger or metal detector is as follows: The item used is supported on the ground surface by the invention, allowing it to be pushed or pulled effortlessly in any direction, by the operator.

From the foregoing it will be apparent to those skilled in the art that a variety of changes and modifications can be made in the size, shape, type, number and arrangement of parts described without departing from the spirit of this invention and the scope of the attachment claims.

Having thus described my invention and the manner in which it may be used, I claim:

1. A wheel attachment apparatus for hand-held trimmers, edgers, metal detectors and similar devices having a working unit supported on the bottom end of an elongated, tubular carrying wand, the wheel attachment apparatus comprising:

a) a substantially A-shaped frame having a pair of leg members mounting at their bottom ends a wheel-mounting axle member and at their upper ends a wand engaging clamp assembly, b) the clamp assembly comprising a pair of opposite clamp members each mounted on a corresponding leg member and together forming a bushing configured to receive the tubular wand of a trimmer therethrough, said bushing dimensioned to receive a wand loosely for rotation of the wand therein, and c) securing means engaging the clamp assembly to releasably secure the bushing in a desired longitudinal position on the wand, the securing means comprising a pair of stop members secured independently to the wand of a trimmer on each side of the clamp members forming the bushing, the stop members preventing longitudinal movement of the clamp assembly along the wand, whereby the wand is permitted rotational movement within the bushing and prevented from longitudinal movement therein.

2. The wheel attachment apparatus of claim 1 wherein the securing means engaging the clamp assembly includes a threaded screw inter-connecting the opposite clamp members, and said bushing formed thereby is dimensional so that a wand received therein is frictionally clamp in the bushing when the screw is operated to draw the opposite clamp members together about the wand.

* * * * *